(12) United States Patent
Shi et al.

(10) Patent No.: US 11,180,011 B2
(45) Date of Patent: Nov. 23, 2021

(54) TRUCK BED COVER LOCKING DEVICE, TRUCK BED AND TRUCK

(71) Applicant: CHANGZHOU SUNWOOD INTERNATIONAL TRADING CO., LTD., Changzhou (CN)

(72) Inventors: Hang Shi, Changzhou (CN); Hongjuan Zheng, Changzhou (CN)

(73) Assignee: CHANGZHOU SUNWOOD INTERNATIONAL TRADING CO., LTD., Changzhou (CN)

(*) Notice: Subject to any disclaimer, the term of this patent is extended or adjusted under 35 U.S.C. 154(b) by 188 days.

(21) Appl. No.: 16/737,931

(22) Filed: Jan. 9, 2020

(65) Prior Publication Data

US 2020/0324632 A1 Oct. 15, 2020

(30) Foreign Application Priority Data

Apr. 12, 2019 (CN) .......................... 201910292058.0

(51) Int. Cl.
*B60J 7/14* (2006.01)
*B60P 7/08* (2006.01)

(52) U.S. Cl.
CPC ............. *B60J 7/141* (2013.01); *B60P 7/0807* (2013.01)

(58) Field of Classification Search
CPC . B60J 7/085; B60J 7/1621; B60J 7/062; B60J 7/102; B60J 7/141; B60J 7/104; B60J 7/065; B60J 7/1614; B60J 11/00; B60J 7/10; B60J 7/041; B60P 7/0876; B60P 7/04; B60P 7/02; B60P 3/40; B60P 7/0815; B60P 7/14; B60P 1/00; B60P 1/02; B60P 1/28; B60P 1/435; B60P 3/04
USPC ... 296/100.09, 100.01, 136.06, 37.6, 100.07, 296/98, 97.23, 160
See application file for complete search history.

(56) References Cited

U.S. PATENT DOCUMENTS

| 5,931,521 A * | 8/1999 | Kooiker ................... B60J 7/141 296/100.09 |
| 6,264,266 B1 * | 7/2001 | Rusu ...................... B60J 7/1621 296/100.06 |
| 6,422,635 B1 * | 7/2002 | Steffens .................. B60J 7/141 296/100.09 |
| 8,182,021 B2 | 5/2012 | Maimin et al. |
| 8,690,224 B2 * | 4/2014 | Maimin ................... B60P 7/02 296/100.09 |

(Continued)

*Primary Examiner* — D Glenn Dayoan
*Assistant Examiner* — Sunsurraye Westbrook
(74) *Attorney, Agent, or Firm* — Bayramoglu Law Offices LLC

(57) ABSTRACT

The truck bed cover locking device includes a side rail, a latch structure and a latch locking component. The latch structure is detachably mounted on the side rail. The latch structure includes a limiting surface. The latch locking component is provided on a truck bed cover. The latch locking component includes a plunger capable of at least partially moving to a position below the limiting surface. The limiting surface extends toward the plunger, and an extending length of the limiting surface is not less than the length of the plunger moving to a position below the limiting surface. The latch structure is detachably provided on the side rail, and fits with the latch locking component on the truck bed cover, thereby tightly locking the truck bed cover on the side rail, and protecting the side rail from damage.

19 Claims, 6 Drawing Sheets

(56) References Cited

U.S. PATENT DOCUMENTS 11,059,359 B2 * 7/2021 Dylewski, II ............ B60J 7/141

* cited by examiner

TRUCK BED COVER LOCKING DEVICE, TRUCK BED AND TRUCK

CROSS REFERENCE TO THE RELATED APPLICATIONS

This application is based upon and claims priority to Chinese Patent Application No. CN 201910292058.0, filed on Apr. 12, 2019, the entire contents of which are incorporated herein by reference.

TECHNICAL FIELD

The present disclosure relates to the field of automobiles and more specifically to a truck bed cover locking device, a truck bed and a truck.

BACKGROUND

A light truck is a very handy vehicle for transportation and the truck includes an enclosed cab and an open truck bed. The open truck bed can be used to conveniently stow various goods. Since the truck bed is open, a truck bed cover is needed to cover the truck bed.

The existing truck bed cover system for covering a truck bed generally includes a protective layer of material to cover the truck bed. The front end of the truck bed cover layer is connected to the front frame edge. The rear end of the covering layer is connected to the rear frame edge. In use, the rear frame edge is pulled backward. The protective covering layer covers the truck bed and the two ends of the front frame edge are fixed on a fixing mechanism, so as to ensure the protective cover layer covers the truck bed. For example, the U.S. Pat. No. 8,182,021B2 discloses a cover assembly for a pick-up truck cargo box. The cover assembly includes first and second side rails and each side rail includes: a drain channel with a drain opening between the first side and the second side of the drain channel; a clamp plate above the first side of the drain channel; a panel support surface on the second side of the drain channel, that is perpendicular to the clamp plate; two or more fittings attaching the first and second side rails to the first and second sides of the cargo box, respectively; a folding cover supported on the side rails, including: a first panel pivotally connected to a second panel, and a third panel pivotally connected to the second panel; and a latch locking component on at least one of the panels, having one or more plungers capable of at least partially moving into the first or second side rail. The above patent discloses the side rails and the folding cover structure supported on the side rails. However, the plungers in the latch locking component extend into the side rails to prevent the folding cover from protruding via the limiting function of the side rail structure in the vertical direction. This way, the plungers are bound to contact and collide with the side rails, which is prone to damage the side rails after using the cover for a long period of time. In addition, the latch locking component of the above patent limits the folding cover in the vertical direction, and fails to limit the folding cover in the front and rear horizontal directions.

SUMMARY

To address the technical issues in the prior art, where the latch locking component easily collides with, and damages the side rails after the cover assembly is used for a long period of time, the present disclosure provides a truck bed cover locking device, a truck bed, and a truck to address the above-mentioned technical issues. The technical solutions of the present disclosure are described below.

A truck bed cover locking device includes a side rail and a latch structure. The latch structure is detachably mounted on the side rail. The latch structure includes a limiting surface and a latch locking component. The latch locking component is provided on the truck bed cover. The latch locking component includes a plunger capable of at least partially moving to a position below the limiting surface. The limiting surface extends toward the plunger, and an extending length of the limiting surface is not less than a length of the plunger moving to the position below the limiting surface.

The latch structure is provided on the side rail, and fits with the latch locking component on the truck bed cover, thereby locking the truck bed cover on the side rail. The latch locking component fits with the latch structure, and will not collide with the side rail, thereby protecting the side rail from damage. Further, the length of the limiting surface is designed as not to extend less than the length of the plunger moving to the position below the limiting surface, so that when the plunger fits with the latch structure, the plunger structure can avoid colliding with the inner side of the latch structure, thus further protecting the side rail and the latch structure. The latch structure is detachably mounted on the side rail for easy disassembly and replacement.

Further, the latch structure includes a protruded surface. The surface of the truck bed cover facing toward the protruded surface is provided with a limiting structure fitted within the protruded surface.

Further, the limiting structure is a groove. The shape of the groove is matched with the shape of the protruded surface.

Further, the side rail includes a vertical support surface. The first end of the vertical support surface extends out of a pressure-bearing surface towards the truck bed. The second end of the vertical support surface extends out of an oblique support surface towards the truck bed cover. The transverse support surface is arranged between the vertical support surface and the oblique support surface.

Further, a drain channel is formed and surrounded by the oblique support surface, the vertical support surface and the transverse support surface. The transverse support surface is provided with a plurality of through-holes. The transverse support surface is provided with a sealing rubber strip. The through-holes are located between the sealing rubber strip and the vertical support surface.

Further, the oblique support surface at least partially extends out of the surface of the transverse support surface. The latch structure further includes a connecting portion connected to the side rail. The first end of the connecting portion is hooked to an extending portion of the oblique support surface, and the second end of the connection portion is attached to and securely connected to the oblique support surface.

Further, the oblique support surface at least partially extends out of a surface of the transverse support surface to form a first extending portion. A second extending portion extends from the end of the oblique support surface near the vertical support surface. The latch structure further includes a connection portion connected to the side rail. Two ends of the connection portion are hooked to the first extending portion and the second extending portion, respectively. The connection portion is attached to and fixedly connected to the oblique support surface.

Further, the side rail is fixed on the truck bed through a fixed component. The vertical support surface is attached to a side wall of the truck bed. The fixed component includes an inner clamp block and an outer clamp block. The first end of the outer clamp block tightly presses the side wall of the truck bed. The first end of the inner clamp block is hooked to the first extending portion of the oblique support surface and is attached to the oblique support surface. The second end of the inner clamp block is securely connected to the second end of the outer clamp block.

A truck bed includes the above-mentioned truck bed cover locking device.

A truck includes the above-mentioned truck bed.

Based on the above-mentioned technical solutions, the present disclosure can realize technical effects as follows.

1. According to the truck bed cover locking device of the present disclosure, the latch structure is provided on the side rail in cooperation with the latch locking component on the truck bed cover, therefore the truck bed cover could be tightly locked on the side rail. The latch locking component cooperates with the latch structure, and will not collide with the side rail, thereby protecting the side rail from damage. Further, the extended length of the limiting surface is designed to be not less than the length of the plunger moving to the position below the limiting surface, so that when the plunger cooperates with the latch structure, the plunger structure can avoid colliding with the inner side of the latch structure, thus further protecting the side rail and the latch structure. The latch structure is detachably mounted on the side rail for easy disassembly and replacement.

2. According to the truck bed cover locking device of the present disclosure, the latch structure further includes a protruded surface. The limiting structure is correspondingly provided on the protruded surface and the truck bed cover in order to limit the truck bed cover to a horizontal direction and to prevent the truck bed cover from moving in a horizontal direction. The limiting structure is designed as a long groove to prevent the truck bed cover from shaking back and forth. The limiting structure is designed as a groove that is matched with the shape of the protruded surface to prevent the truck bed cover from moving forth and back, or left to right, which further ensures the truck bed cover stays put on the truck bed.

3. According to the truck bed cover locking device of the present disclosure, the structure of the side rail is reasonable. The side rail includes a vertical support surface attached to the side wall of the truck bed. The pressure-bearing surface is placed on the upper surface of the truck bed, and the pressure-bearing surface is configured to support the truck bed cover. The oblique support surface extends toward the truck bed cover for connection to the latch structure. The transverse support surface is arranged between the vertical support surface and the oblique support surface, which can prevent deformation. In the case where the side rail is fixed on the truck bed by a fixed component, and the side rail supports the truck bed cover at the same time, the transverse support surface can prevent the side rail from deformation by force.

4. According to the truck bed cover locking device of the present disclosure, a drain channel is formed and surrounded by the oblique support surface, the vertical support surface and the transverse support surface. A plurality of through-holes are provided on the transverse support surface, to facilitate the water flow through the through-holes into the drain channel for discharge. The transverse support surface is further provided with a sealing rubber strip. The through-holes are located between the sealing rubber strip and the vertical support surface. In this way, the water flow can be sealed between the vertical support and the sealing rubber strip, and the water flow can be discharged completely by entering the drain channel through the through-holes rather than the interior of the truck bed, thereby achieving the required drainage and sealing effect.

5. According to the truck bed cover locking device of the present disclosure, the oblique support surface is provided with an extending portion, and the latch structure is hooked to the extending portion and is attached to the oblique support surface for fixed connection. In this way, the connection contact surface between the connection portion of the latch structure and the side rail can be increased, and the latch structure is not easily separated from the side rail.

6. According to the truck bed cover locking device of the present disclosure, the side rail is securely connected to the truck bed through the fixed component. The outer clamp block tightly presses the side wall of the truck bed. The inner clamp block is hooked to and attaches to the oblique support surface. The inner clamp block and the outer clamp block are securely connected, and the contact area between the inner clamp block and the side rail is large, so that the side rail can be firmly secured to the truck bed.

7. According to the truck bed and the truck of the present disclosure, the above-mentioned truck bed cover locking device can firmly and securely fix the truck bed cover on the truck bed, so that the truck bed cover is not likely to shake and fall off from the truck bed. Moreover, the external water can be discharged through the drain channel on the side rail that has a long service life, good stability and is safe.

Figure 1:
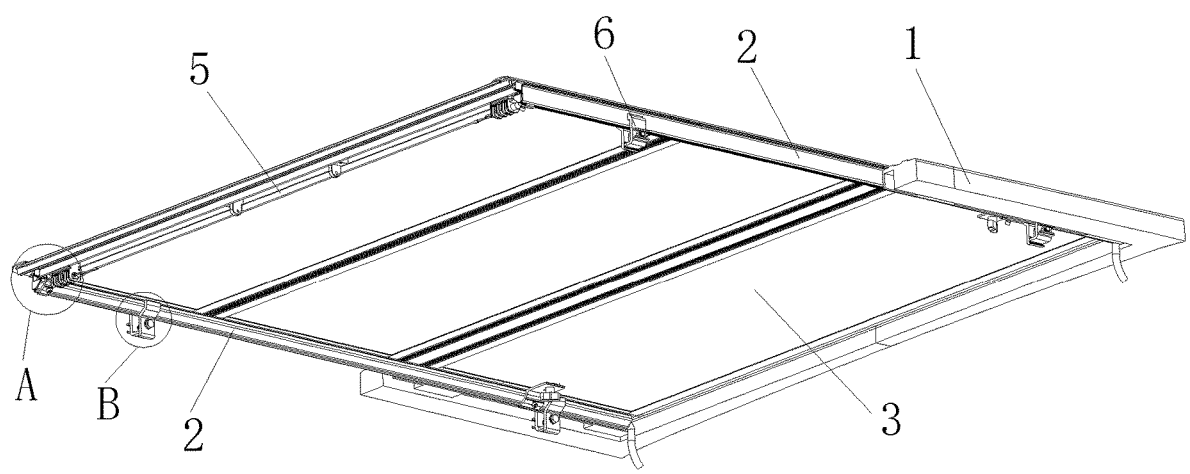
FIG. 1 is a structural schematic diagram showing a truck bed cover fixed on a truck bed of the present disclosure.
Figure 2:
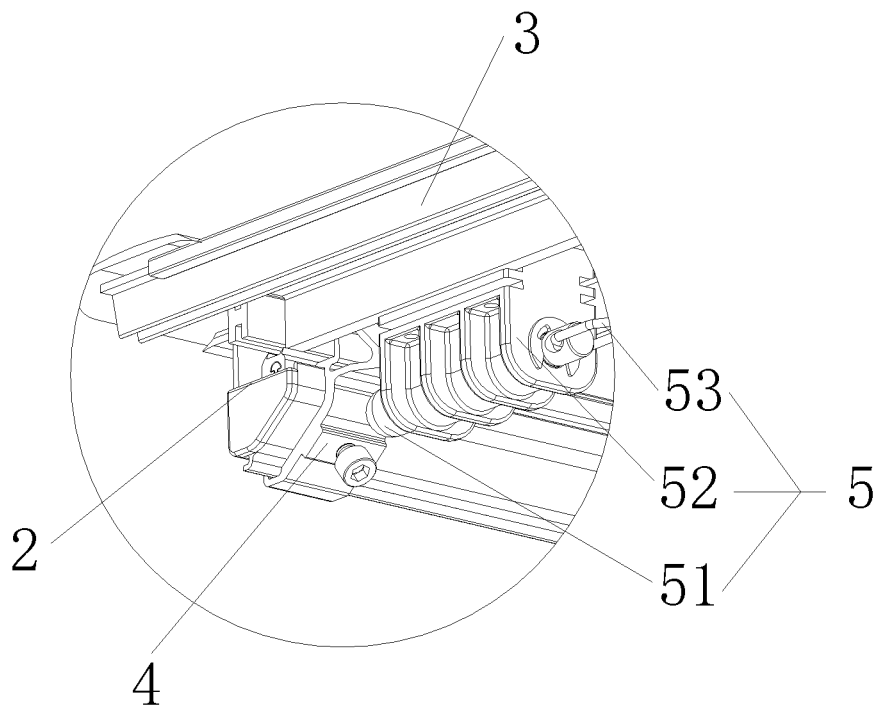
FIG. 2 is an enlarged view of part A of FIG. 1.
Figure 3:
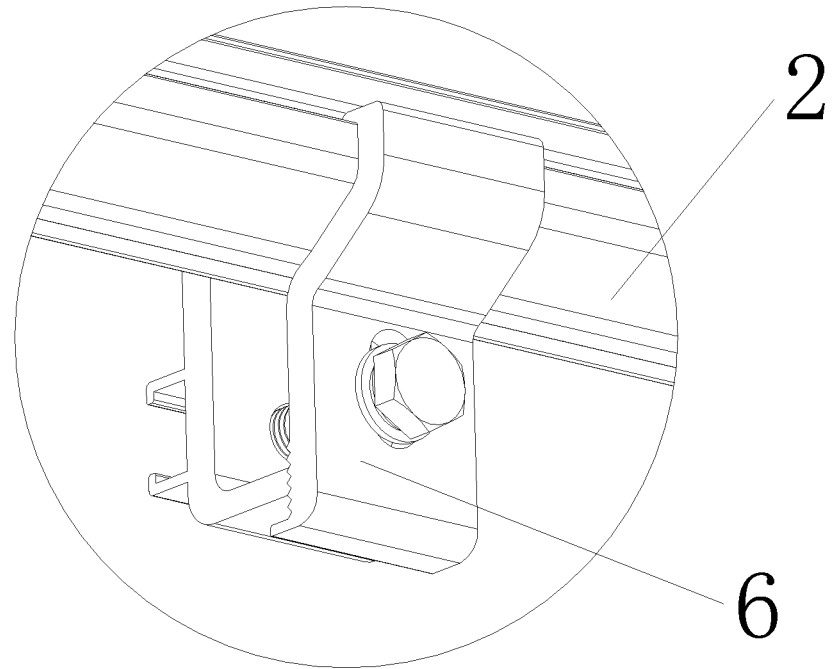
FIG. 3 is an enlarged view of part B of FIG. 1.
Figure 4:
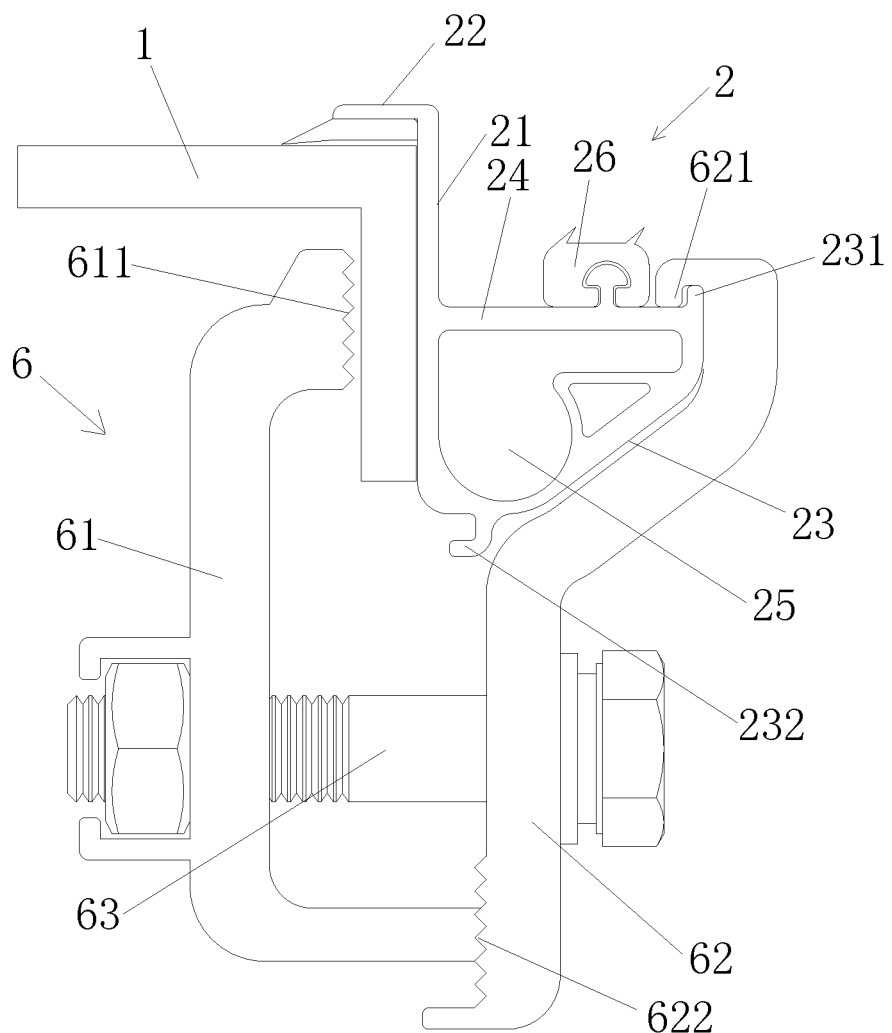
FIG. 4 is a structural schematic diagram showing a side rail mounted on a truck bed.
Figure 5:
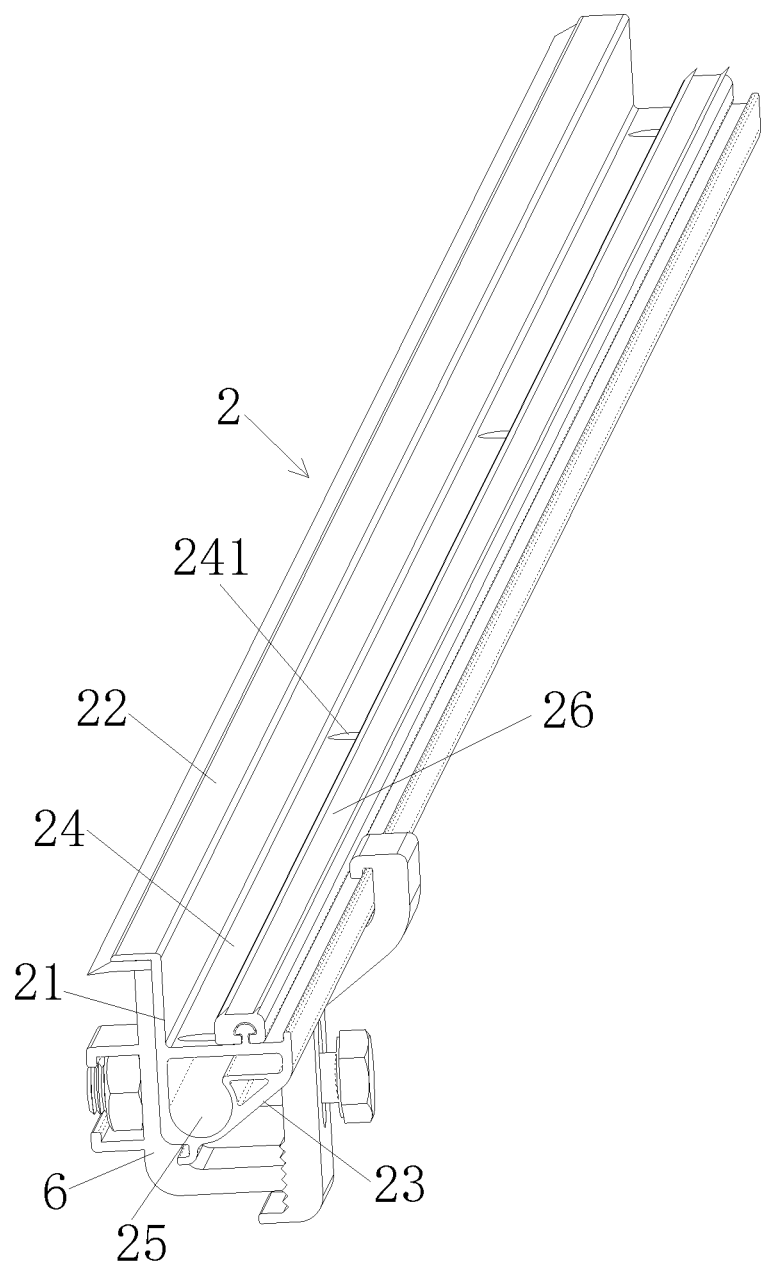
FIG. 5 is a perspective view showing a side rail mounted on a truck bed.
Figure 6:
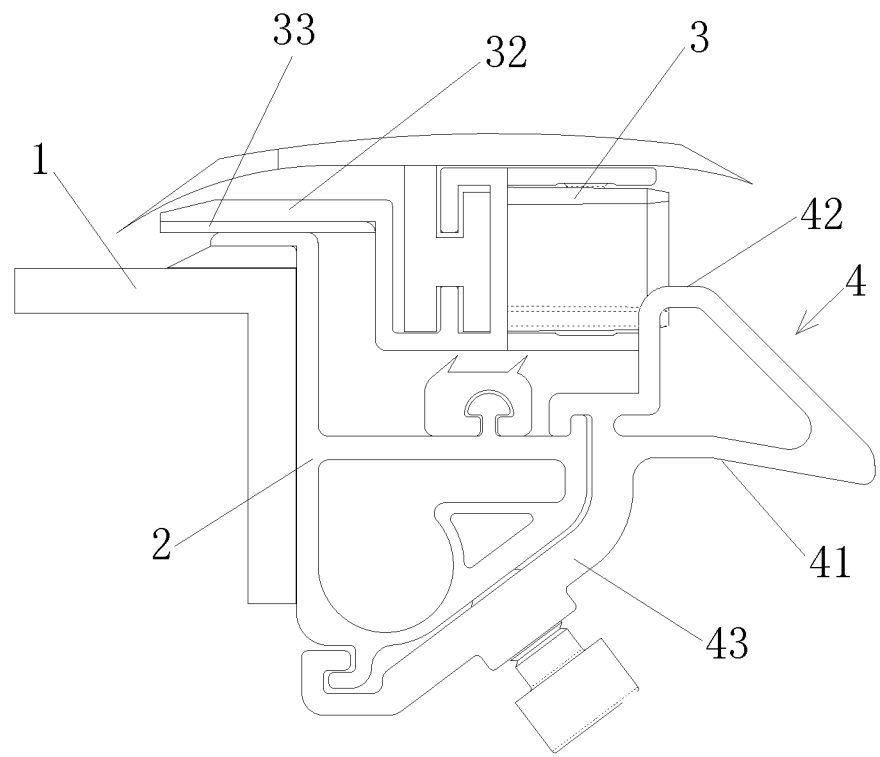
FIG. 6 is a structural schematic diagram showing a latch structure mounted on a side rail.
Figure 7:
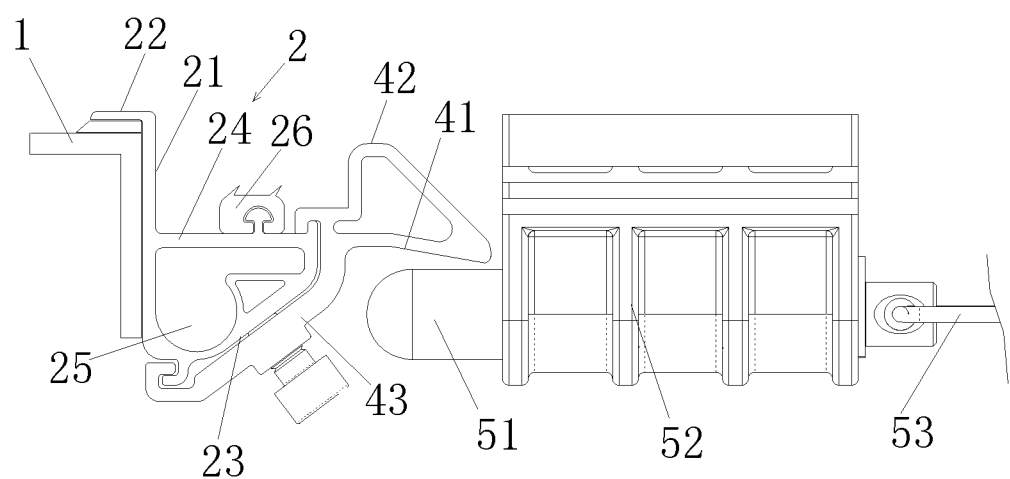
FIG. 7 is a structural schematic diagram showing a latch structure fitted with a latch locking component.

In the figures: 1—truck bed; 2—side rail; 21—vertical support surface; 22—pressure-bearing surface; 23—oblique support surface; 231—first extending portion; 232—second extending portion; 24—transverse support surface; 241—through-hole; 25—drain channel; 26—sealing rubber strip; 3—truck bed cover; 31—limiting structure; 32—side pole; 33—interlayer; 4—latch structure; 41—limiting surface; 42—protruded surface; 43—connection portion; 5—latch locking component; 51—plunger; 52—plunger base; 53—pull rope; 6—fixed component; 61—outer clamp block; 611—first press surface; 62—inner clamp block; 621—hook portion; 622—second press surface; 63—fixing member.

DETAILED DESCRIPTION OF THE EMBODIMENTS

The contents of the present disclosure are further described hereinafter with reference to the drawings.

As shown in FIGS. 1-8, the present embodiment provides a truck bed cover locking device which includes the side rail 2 provided on the truck bed 1 and the latch locking component 5 provided on the truck bed cover 3. The latch structure 4 is mounted on side rail 2 and can be detached when necessary. The latch locking component 5 and the latch structure 4 collaboratively and securely lock the truck bed cover 3 on the truck bed 1.

The side rail 2 is fixed on the truck bed 1. The side rail 2 includes the vertical support surface 21. The vertical support surface 21 is attached to the side wall of the truck bed 1. The upper end of the vertical support surface 21 extends out of the pressure-bearing surface 22 toward the truck bed 1, and the pressure-bearing surface 22 is configured to support the truck bed cover 3. The lower end of the vertical support surface 21 extends out of the oblique support surface 23 toward the truck bed cover 3. Specifically, the oblique support surface 23 is arranged to be fully or partially inclined. In the present embodiment, the oblique support surface 23 is arranged to be partially inclined, and both ends can be arranged in cooperation with the horizontal plane and the vertical plane. The transverse support surface 24 is arranged between the vertical support surface 21 and the oblique support surface 23. The transverse support surface 24 is capable of preventing the side rail 2 from being deformed when bearing a large clamping force.

Further, the drain channel 25, for discharging the water entering through the truck bed cover 3 and the pressure-bearing surface 22, is formed and surrounded by the oblique support surface 21, the vertical support surface 23 and the transverse support surface 24, thus preventing the water from entering the interior of the truck bed 1. The transverse support surface 24 is provided with a plurality of through-holes 241, and water can enter the drain channel 25 through the through-holes 241 and be discharged. Further, the transverse support surface 24 is provided with the sealing rubber strip 26. The sealing rubber strip 26 extends from one end to the other end of the side rail 2. When the truck bed cover 3 is supported on the pressure-bearing surface 22, a lower surface of the truck bed cover 3 can press the sealing rubber strip 26 tightly, forming a sealing effect on the interior of the truck bed 1. Specifically, the side pole 32 is connected to a side edge of the truck bed cover 3 near the side rail 2. The side pole 32 is bent and extended to contact the pressure-bearing surface 22, and the pressure-bearing surface 22 supports the truck bed cover 3 by supporting the side pole 32. Preferably, the interlayer 33 is further provided on a lower surface of the side pole 32 in contact with the pressure-bearing surface 22. The interlayer layer 33 includes, but is not limited to, a sponge layer. Further, the through-holes 241 are located between the sealing rubber strip 26 and the vertical support surface 21, thus ensuring that the water enters the drain channel 25 through the through-holes 241 and be discharged. Even if the amount of water is large, it will not enter the interior of the truck bed.

Preferably, the oblique support surface 23 at least partially extends out of the surface of the transverse support surface 24 to form the first extending portion 231. Further, the second extending portion 232 extends from an end of the oblique support surface 23 near the vertical support surface, and preferably, the second extending portion 232 has a hook shape. The first extending portion 231 and the second extending portion 232 are configured to easily connect the oblique support surface 23 with other components.

The side rail 2 is fixed on the truck bed 1 through the fixed component 6. The fixed component 6 includes the outer clamp block 61 and the inner clamp block 62. The first end of the outer clamp block 61 tightly presses the side wall of the truck bed 1. The first end of the inner clamp block 62 is matched with the shape of the oblique support surface 23, and the first end of the inner clamp block 62 is hooked to at least the first extending portion 231 of the oblique support surface 23 and attached to the oblique support surface 23. The second end of the inner clamp block is securely connected to the second end of the outer clamp block via the fixing member 63. Specifically, the first press surface 611 where the outer clamp block 61 is tightly pressed on the side wall of the truck bed 1 is designed to be textured. For example, the first press surface 611 is zigzag, frosted, among other textures, thus increasing the friction between the first press surface 611 and the side wall of the truck bed 1. The second end of the outer clamp block 61 abuts against the second press surface 622 of the inner clamp block 62. The second press surface 622 may be designed to be textured, for example, the second press surface 622 is zigzag, frosted, among other textures, thus increasing the friction between the second press surface 622 and an end face of the outer clamp block 61. The outer clamp block 61 is provided with the hook portion 621 for hooking the first extending portion 231. Preferably, the fixing member 63 is a bolt that passes through the outer clamp block 61 and the inner clamp block 62 to secure the two together.

Figure 8:
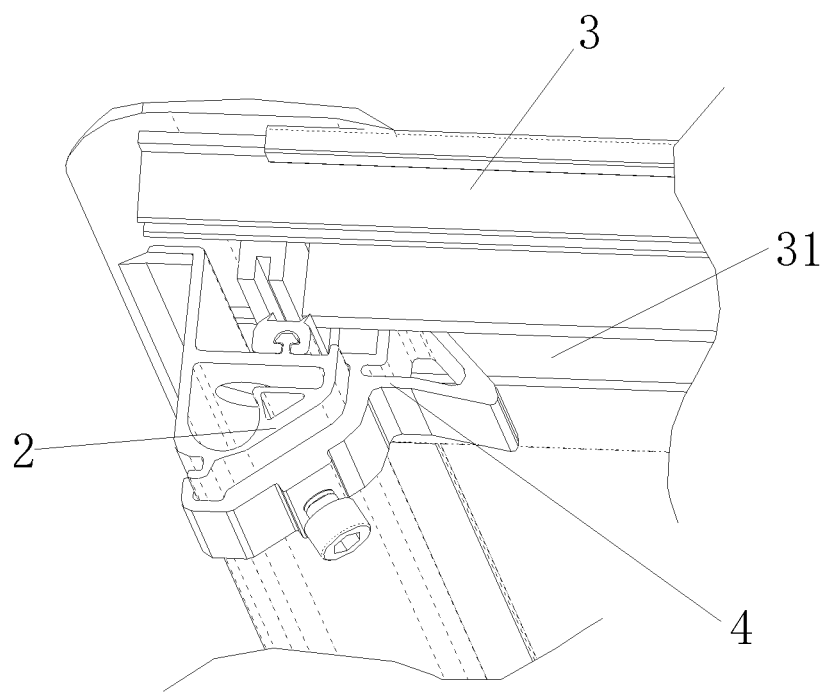
FIG. 8 is a structural schematic diagram showing a latch structure fitted with a limiting structure on a truck bed cover.

The side rail 2 is detachable and may be provided with the latch structure 4, and the latch structure 4 and the fixed component 6 are arranged in a staggered manner. The latch structure 4 includes the limiting surface 41, the protruded surface 42, and the connecting portion 43, and the latch structure 4 is mounted on the side rail 2 through the connecting portion 43. Specifically, the shape of the connecting portion 43 is matched with the shape of the oblique support surface 23, and the connecting portion 43 is attached to the oblique support surface 23. The upper end of the connection portion 43 can be hooked to the first extending portion 231 of the oblique support surface 23 or both ends of the connection portion 43 can be hooked to the first extending portion 231 and the second extending portion 232 of the oblique support surface 23, respectively. The connection portion 43 is securely connected to the oblique support surface 23 through a fixed connecting component. Preferably, the fixed connecting component may be a bolt, and the connecting portion 43 and the oblique support surface 23 are securely connected by the bolt. The limiting surface 41 extends toward the latch locking component 5. Specifically, the limiting surface 41 is the lower surface of the latch structure 4, and the limiting surface 41 extends slightly downward, so that the limiting surface 41 and the latch locking component 5 can form a point-to-point contact, which reduces the contact area. The protruded surface 42 protrudes toward the truck bed cover 3. Correspondingly, the surface on the truck bed cover 3 facing toward the protruded surface, 42 is provided with a limiting structure 31 fitted with the protruded surface 42. As shown in FIG. 8, the limiting structure 31 has a groove structure. The limiting structure 31 may be designed as a long groove. The protruded surface 42 is inserted into the long groove-shaped limiting structure 31 to prevent the truck bed cover 3 from moving back and forth or left to right. Further, the limiting structure 31 can be designed as a groove and matched with the shape of the protruded surface 42. The protruded surface 42 is inserted into the groove to prevent the truck bed cover 3 from moving back and forth, or left to right.

The latch locking component 5 is provided on the truck bed cover 3. The latch locking component 5 includes the plunger 51, the pull rope 53, and the reset component. The plunger 51 is mounted on the truck bed cover 3 through the plunger base 52. The plunger 51 is provided inside the plunger base 52 in a sliding manner. The outer end of the plunger 51 stretches out of the plunger base 52 under the action of the reset component. The pull rope 53 can pull the plunger 51 to overcome the action force of the reset component, making the outer end of the plunger 51 retract toward the plunger base 52. When the truck bed cover 3 needs to be tightly locked, the truck bed cover 3 is placed on the truck bed 1, and the plunger 51 stretches out of the plunger base 52 under the action of the reset component and at least partially moves to a position below the limiting surface 41, thereby limiting a vertical position of the plunger 51 by the limiting surface 41. Preferably, the limiting surface 41 extends toward the plunger 51 and an extending length of the limiting surface 41 is not less than a length where the plunger 51 moves to the position below the limiting surface 41. In this way, the outermost end of the plunger 51 will not contact the latch structure 4, thereby protecting the latch structure 4 from damage. Further, the limiting surface 41 extends towards the plunger 51 and the extending length of the limiting surface 41 is larger than the length where the plunger 51 moves to the position below the limiting surface 41.

Based on the above-mentioned structures, when the truck bed cover locking device of the present embodiment is in use, the pull rope 53 can be first pulled to cause the plunger 51 retract, and then the truck bed cover 3 covers the truck bed 1, wherein the truck bed cover 3 is supported on the pressure-bearing surface 22, and the plunger 51 is lower than the latch structure 4. After that, the pull rope 53 is loosened, the plunger 51 extends and moves to the position below the limiting surface 41 under the action of the reset component, and the limiting surface 41 limits the horizontal height of the plunger 51. Meanwhile, the protruded surface 42 extends into the limiting structure of the truck bed cover 3 to prevent the truck bed cover 3 from moving in a horizontal direction. In case of heavy rain, the rainwater enters the side rail 2 through the gap between the truck bed cover 3 and the pressure-bearing surface 22, then falls into the drain channel 25 through the through-holes 241 on the transverse support surface 24, and is then discharged. Moreover, the sealing rubber strip 26 can prevent the rainwater from entering the interior of truck bed 1.

The present embodiment further provides a truck bed which includes the above-mentioned truck bed cover locking device. The truck bed cover locking device is configured to firmly lock the truck bed cover and protect the objects in the truck bed.

The present embodiment further provides a trunk like structure that includes the above-mentioned truck bed. The above-mentioned truck bed is configured to protect the objects in the truck bed from being damaged.

The embodiments of the present disclosure are described in detail with reference to the drawings presented in this application. However, the present disclosure is not limited to the above-mentioned embodiments. An ordinary person skilled in the art can make various changes without departing from the purposes of the present disclosure based on the knowledge known in the art.

What is claimed is:

1. A truck bed cover locking device, characterized in that, comprising:
    a side rail;
    a latch structure, wherein the latch structure is mounted on the side rail and detachable, and the latch structure comprises a limiting surface; and
    a latch locking component, wherein the latch locking component is provided on a truck bed cover, the latch locking component comprises a plunger capable of partially or fully moving to a position below the limiting surface, the limiting surface extends toward the plunger, and an extending length of the limiting surface is not less than a length of the plunger moving to the position below the limiting surface.

2. The truck bed cover locking device according to claim 1, wherein, the latch structure further comprises a protruded surface; and a surface of the truck bed cover facing toward the protruded surface is provided with a limiting structure fitted with the protruded surface.

3. The truck bed cover locking device according to claim 2, wherein, the limiting structure is a groove; and a shape of the groove is matched with a shape of the protruded surface.

4. The truck bed cover locking device according to claim 1, wherein, the side rail comprises a vertical support surface; an end of the vertical support surface extends out of an oblique support surface toward the truck bed cover; and a transverse support surface is arranged between the vertical support surface and the oblique support surface.

5. The truck bed cover locking device according to claim 4, wherein, a drain channel is formed and surrounded by the oblique support surface, the vertical support surface and the transverse support surface; the transverse support surface is provided with a plurality of through-holes.

6. The truck bed cover locking device according to claim 4, wherein, the oblique support surface partially or fully extends out of a surface of the transverse support surface to form a first extending portion; the latch structure further comprises a connecting portion connected to the side rail; a first end of the connection portion is hooked to the first extending portion of the oblique support surface, and a second end of the connection portion is attached to and fixedly connected to the oblique support surface.

7. The truck bed cover locking device according to claim 4, wherein, the oblique support surface partially or fully extends out of a surface of the transverse support surface to form a first extending portion, and a second extending portion extends from an end of the oblique support surface near the vertical support surface; the latch structure further comprises a connecting portion connected to the side rail; two ends of the connection portion are hooked to the first extending portion and the second extending portion, respectively; and the connection portion is attached to and fixedly connected to the oblique support surface.

8. The truck bed cover locking device according to claim 4, wherein, the side rail is fixed on the truck bed through a fixed component; the vertical support surface is attached to a side wall of the truck bed; the fixed component comprises an outer clamp block and an inner clamp block; a first end of the outer clamp block tightly presses the side wall of the truck bed; a first end of the inner clamp block is hooked to the oblique support surface and attached to the oblique support surface; and a second end of the inner clamp block is fixedly connected to a second end of the outer clamp block.

9. A truck bed, comprising the truck bed cover locking device according to claim 1.

10. A truck, comprising the truck bed according to claim 9.

11. The truck bed according to claim 9, wherein, the latch structure further comprises a protruded surface; and a surface of the truck bed cover facing toward the protruded surface is provided with a limiting structure fitted with the protruded surface.

12. The truck bed according to claim 11, wherein, the limiting structure is a groove; and a shape of the groove is matched with a shape of the protruded surface.

13. The truck bed according to claim 9, wherein, the side rail comprises a vertical support surface; an end of the vertical support surface extends out of an oblique support surface toward the truck bed cover; and a transverse support surface is arranged between the vertical support surface and the oblique support surface.

14. The truck bed cover locking device according to claim 13, wherein, a drain channel is formed and surrounded by the oblique support surface, the vertical support surface and the transverse support surface; the transverse support surface is provided with a plurality of through-holes.

15. The truck bed cover locking device according to claim 13, wherein, the oblique support surface partially or fully extends out of a surface of the transverse support surface to form a first extending portion; the latch structure further comprises a connecting portion connected to the side rail; a first end of the connection portion is hooked to the first extending portion of the oblique support surface, and a second end of the connection portion is attached to and fixedly connected to the oblique support surface.

16. The truck bed cover locking device according to claim 13, wherein,
the oblique support surface partially or fully extends out of a surface of the transverse support surface to form a first extending portion, and a second extending portion extends from an end of the oblique support surface near the vertical support surface; the latch structure further comprises a connecting portion connected to the side rail; two ends of the connection portion are hooked to the first extending portion and the second extending portion, respectively; and the connection portion is attached to and fixedly connected to the oblique support surface.

17. The truck bed cover locking device according to claim 13, wherein, the side rail is fixed on the truck bed through a fixed component; the vertical support surface is attached to a side wall of the truck bed; the fixed component comprises an outer clamp block and an inner clamp block; a first end of the outer clamp block tightly presses the side wall of the truck bed; a first end of the inner clamp block is hooked to the oblique support surface and attached to the oblique support surface; and a second end of the inner clamp block is fixedly connected to a second end of the outer clamp block.

18. A side rail, comprising a vertical support surface, wherein an end of the vertical support surface extends out of an oblique support surface toward a truck bed cover; and a transverse support surface is arranged between the vertical support surface and the oblique support surface.

19. The side rail according to claim 18, wherein, a drain channel is formed and surrounded by the oblique support surface, the vertical support surface and the transverse support surface; the transverse support surface is provided with a plurality of through-holes.

* * * * *